United States Patent Office 3,312,302
Patented Apr. 4, 1967

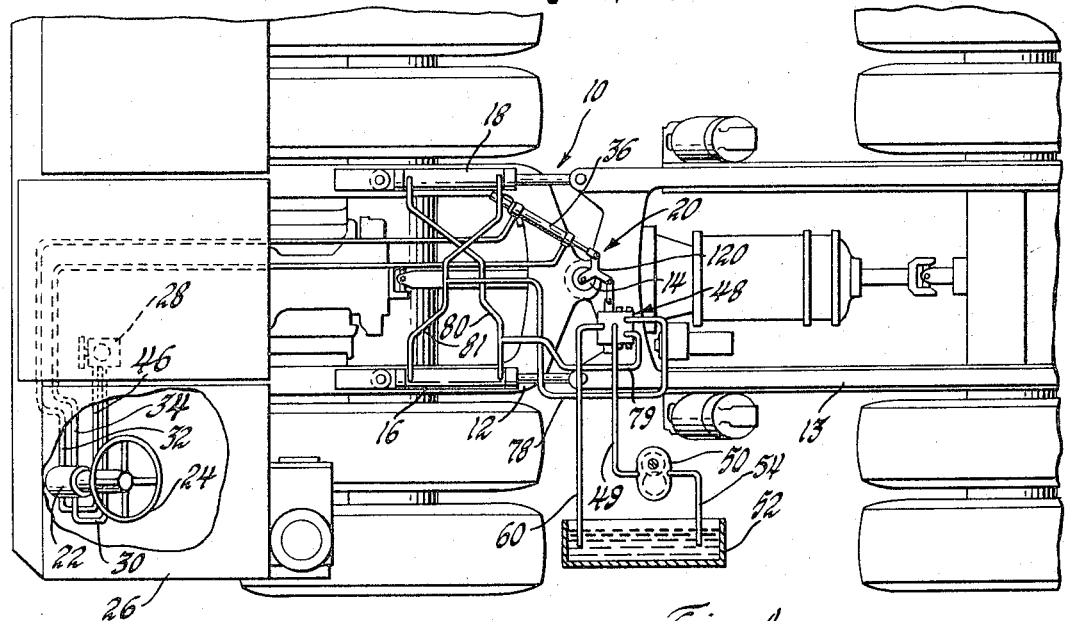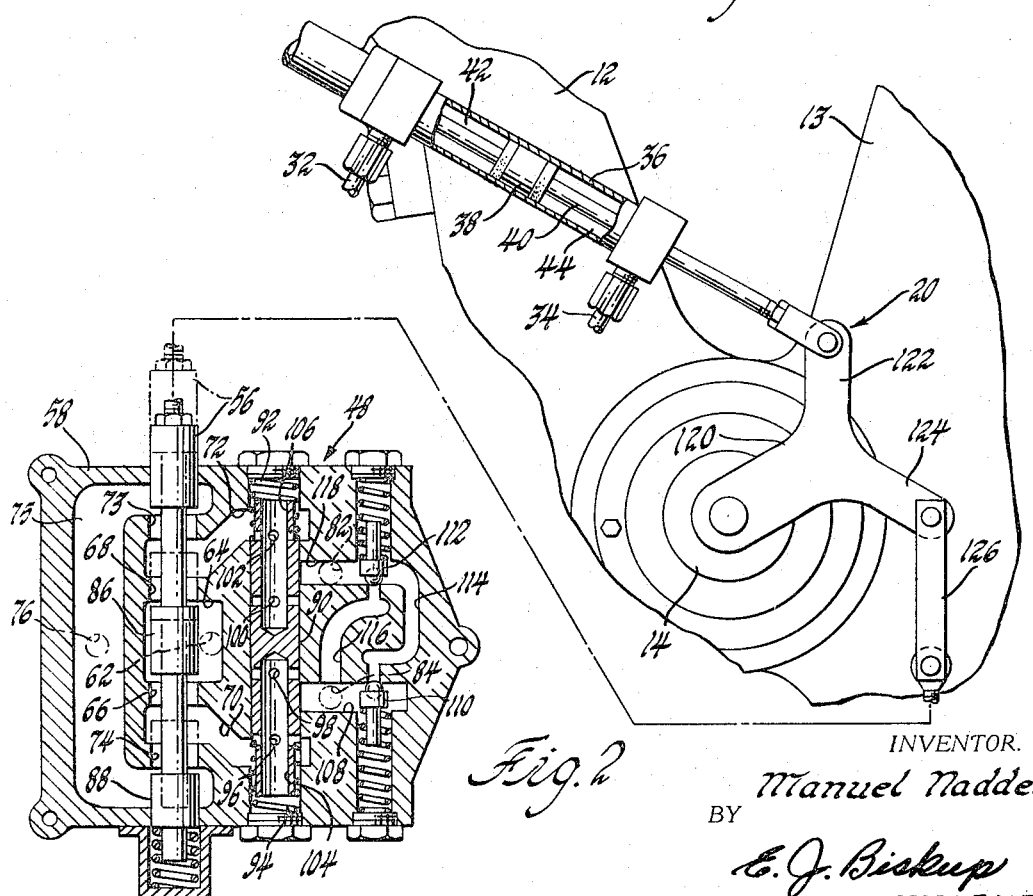

3,312,302
HYDRAULIC STEERING SYSTEM
Manuel Naddell, Los Angeles, Calif., assignor to General Motors Corporation, Detroit, Mich., a corporation of Delaware
Filed Aug. 27, 1965, Ser. No. 483,070
9 Claims. (Cl. 180—79.2)

This invention concerns a steering system for an articulated vehicle and more particularly a so-called full hydraulic steering arrangement having follow-up control responsive to the movement of the vehicle frame sections about the steering axis.

Copending patent application Serial No. 280,928, now Patent No. 3,211,498 entitled "Articulated Rear Dump Vehicle," filed May 15, 1963, in the name of Henry A Peller, discloses a vehicle having first and second frame sections which are pivotally interconnected about a vertical steering axis. This vehicle includes an engine and operator's cab on one of the frame sections and a dump body on the other frame section with a pair of double-acting hydraulic cylinders connected between the frame sections serving to provide relative articulation between the latter under the control of a steering valve associated with the usual steering wheel in the operator's cab. As is typical wtih earth-moving off-highway equipment, this vehicle is of a relatively large size requiring large hydraulic steering cylinders that correspondingly demand large volumes of hydraulic fluid for actuating the same. This has presented a problem inasmuch as the steering valves presently commercially available for full power steering systems are not designed to carry the large flow rates required in this type of vehicle. As a result, the steering valve cannot be connected directly to the hydraulic steering cylinders for supplying pressurized fluid thereto and other provisions must be made. This invention concerns one steering arrangement which utilizes a presently available steering valve for remotely operating a large capacity fluid directional control valve which in turn supplies pressurized fluid to the steering cylinders.

The objects of the present invention are to provide an improved steering system for an articulated vehicle; to provide a steering system having two independent closed hydraulic circuits, one of which includes a hydraulic steering cylinder and a control valve for directing pressurized fluid to the cylinder and the other having a remotely operated fluid actuator for activating the control valve in response to rotation of a steering wheel; to provide a hydraulic steering system for an articulated vehicle having a steering valve connected to a slave cylinder which actuates a control valve that directs pressurized fluid to the steering cylinders; and to provide a follow-up mechanism that includes a lever pivotally mounted on the steer axis of an articulated vehicle and having one portion thereof connected to an actuator and another portion connected to a control valve that directs fluid to the steering cylinders.

The above objects and others are accomplished in a manner which will become more apparent from the following detailed description when taken in view of the accompanying drawing in which:

FIGURE 1 shows a plan view of an articulated vehicle incorporating the hydraulic steering system made in accordance with the invention, and FIGURE 2 is an enlarged view showing the details of the directional control valve and the follow-up mechanism utilized with the invention.

Referring to the drawing, FIGURE 1 shows an articulated vehicle 10 of the type alluded to above and reference is made to the aforementioned patent application for a detailed description of this vehicle. This vehicle consists of a front frame section 12 and a rear frame section 13, the inner ends of which are interconnected by a pivotal connection 14 for relative movement about a vertical steer axis. A pair of double-acting hydraulic cylinders 16 and 18 are pivotally connected between the respective frame sections and serve to provide steering movement of the vehicle in the usual manner by articulating one frame relative to the other about the steer axis.

Actuation of the cylinders 16 and 18 is accomplished by a hydraulic system which includes two independent circuits that are interconnected through a follow-up mechanism generally indicated by the numeral 20. One of the circuits is located on the front frame section 12 and includes a steering valve 22 controlled by a steering wheel 24 located in an operator's cab 26. The steering valve 22 can be any one of the several full power steering valves presently available on the market, one example of which can be seen in Zeigler et al. 3,159,084. A detailed description and disclosure of the steering valve is shown in the aforementioned patent; consequently, it is not deemed necessary to go into any elaborate explanation as to the operation of this type of valve and, for present purposes, it will suffice to mention that by rotating the steering wheel in one direction pressurized fluid generated by a pump and reservoir combination 28 is directed to the steering valve through a line 30 wherefrom it it delivered through one of the two lines 32 and 34 to one end or the other of a slave cylinder 36 which is rigidly mounted to the frame section 12 adjacent the steer axis. The slave cylinder 36 includes a piston 38 through which a rod 40 extends and is rigidly fastened thereto so as to provide fluid chambers 42 and 44 of equal volume on opposite sides of the piston when the latter is centered in the cylinder. Thus, it will be apparent that when one of the lines leading to the slave cylinder 36 is pressurized, the other line serves as an exhaust line for returning fluid to the steering valve wherefrom it is returned to the reservoir through a line 46. It will also be understood that by having the rod 40 located in both chambers of the slave cylinder, the same amount of fluid will be required to move the piston 38 in either direction.

The second circuit of this steering system has a portion thereof located on the rear frame section 13 that includes a directional control valve 48 which receives pressurized fluid through a line 49 from a pump 50 which in turn is connected to a fluid reservoir 52 by a line 54. The control valve 48 serves to selectively pressurize and, accordingly, activate the steering cylinders 16 and 18 in a manner which will become more apparent as the description of the invention proceeds.

The control valve 48 is shown in detail in FIGURE 2 and consists of a spool valve 56 slidably supported within a housing 58 having suitable chambers and passages for directing pressurized fluid to the steering cylinders 16 and 18 and receiving vented fluid therefrom for returning it to the reservoir 52 via line 60. The housing 58 is provided with an inlet port 62 centrally located therein and connected to the pump 50 through the line 49. The inlet port 62 leads into a chamber 64 which in turn connects through apertures 66 and 68 with passages 70 and 72, respectively. The latter passages also connect through apertures 73 and 74 to an exhaust chamber 75 also formed in the housing 58 and connected through an outlet port 76 to line 60 that leads to the reservoir. The steering cylinders 16 and 18 obtain pressurized fluid from the control valve 48 through lines 78 and 79 which are respectively connected to ports 82 and 84 in the valve housing 58. The lines 78 and 79 respectively connect with branch lines 80 and 81 which serve to supply and exhaust fluid to and from the opposite ends of the steering cylinders 16 and 18. The ports 82 and 84 are adapted to be selectively connected with pressurized fluid delivered to chamber 64 whenever the spool valve 56 is shifted upwardly or downwardly, as viewed in FIGURE 2, so as to block the aforementioned apertures formed in the housing. For example, when the spool valve 56 is raised to the phantom line position shown, apertures 68 and 74 are closed by lands 86 and 88 formed on the spool valve. Thus, pressurized fluid is delivered through the passage 70 and a spring centered valve 90 to port 84. The valve 90 is slidably supported in the housing 58 between springs 92 and 94 and is formed with axially spaced ports 96, 98, 100 and 102. A number of similar ports are circumferentially formed adjacent each of the respective ports as seen in the drawings and dead-end bores 104 and 106 serve as passages for connecting respectively ports 96 with ports 98 and ports 100 with ports 102. Hence, it should be apparent that when passage 70 is pressurized, passage 104 is similarly pressurized through ports 96.

This causes the valve 90 to move upwardly, as viewed in FIGURE 2, to a point where ports 96 register with the passage 108 which leads to port 84 so that lines 79 and 80 deliver fluid to the head end of steering cylinder 18 and the rod end of steering cylinder 16 with resultant counterclockwise movement of the frame section 13 about the steer axis. At the same time, fluid being exhausted from the opposite ends of the steering cylinders flows through lines 81 and 78 to port 82 through the spring centered valve, passage 72, aperture 73, chamber 75 and port 76 to the reservoir. It will be noted that the control valve 48 also includes a pair of pressure relief check valves 110 and 112 which respectively connect with passages 114 and 116 and automatically open upon a predetermined excessive pressure being reached in the passages 108 and 118 as could occur when the steering cylinders are in a full locked turn and fluid continues to be delivered to either of the passages.

Thus, in view of the above description it can be seen that two completely independent hydraulic circuits are provided in this system. These circuits are mechanically interconnected through the follow-up mechanism 20 which includes a lever 120 supported on the connection 14 for pivotal movement about an axis coaxial with the steer axis. The lever 120 is formed with arms 122 and 124 which are respectively pivotally connected to the rod 40 of the slave cylinder 36 and a link 126 which in turn is pivotally mounted on the spool valve 56. Accordingly, when the slave cylinder 36 is activated and the piston 38 is moved in one direction or the other, corresponding movement of the lever 120 occurs which in turn shifts the spool valve 56 for pressurizing the steering cylinders as described above. For example, assuming the steering wheel 24 is rotated in a clockwise direction, as viewed in FIGURE 1, line 34 is pressurized causing the piston 38 to move to the left or further into the cylinder so that the lever 120 is rotated counterclockwise about its axis. This results in the spool valve 56 being raised, as described above, so that the appropriate ends of the steering cylinders are pressurized and the frame section 13 is rotated counterclockwise about the steer axis. During such relative movement of the frame sections 12 and 13, it will be noted that inasmuch as the control valve 48 is rigidly mounted on the moving frame section 13 and is, in fact, also moving in a counterclockwise direction about the steer axis, a self-centering action of the spool valve 56 occurs since the latter is connected to the lever 120 through the link 126. Therefore, a follow-up control is provided so that steering is automatically discontinued once the control valve 48 and frame section 13 move a distance about the steering axis corresponding to the distance of movement of the lever 120 as generated by the slave cylinder.

It will be understood from the above that when the steering wheel 24 is rotated in a counterclockwise direction, the piston 38 will move to the right to extend the rod 40 and cause the spool valve 56 to be shifted downwardly, as viewed in FIGURE 2, closing apertures 66 and 73. This will result in pressurization of the rod end and piston end of the steering cylinders 16 and 18, respectively, so that the frame section 13 is moved clockwise about the steer axis with similar follow-up action of the spool valve as explained above.

Various changes and modifications can be made in this construction without departing from the spirit of the invention. Such changes and modifications are contemplated by the inventor and he does not wish to be limited except by the scope of the appended claims.

I claim:

1. A hydraulic steering system for an articulated vehicle having first and second frame sections pivotally interconnected about a vertical steering axis, at least one double-acting hydraulic cylinder connected between said frame sections for effecting relative movement thereof about said steering axis, a source of pressurized fluid, a control valve mounted on one of said frame sections adjacent said pivot axis for supplying pressurized fluid from said source to said hydraulic cylinder, a slave cylinder comprising a relatively movable piston member, said slave cylinder being mounted on the other of said frame sections adjacent said pivot axis, a force transmitting member supported on said vehicle for pivotal movement about said steering axis, means pivotally connecting said piston member and said control valve to said force transmitting member, said means being spaced from the steering axis, a steering wheel mounted on said other of said frame sections, means operatively connecting said steering wheel to said slave cylinder so that movement of the steering wheel causes the piston member to actuate said control valve through said lever whereby pressurized fluid is directed to said hydraulic cylinder.

2. A hydraulic steering system for an articulated vehicle having first and second frame sections pivotally interconnected about a vertical steering axis, at least one double-acting hydraulic cylinder connected between said frame sections for effecting relative movement thereof about said steering axis, a source of pressurized fluid, a control valve mounted on one of said frame sections adjacent said pivot axis for supplying pressurized fluid from said source to said hydraulic cylinder, a slave cylinder comprising a relatively movable piston member, said slave cylinder being mounted on the other of said frame sections adjacent said pivot axis, a lever supported on said vehicle for pivotal movement about said steering axis, first means pivotally connecting said piston member to said lever at a point spaced from the steering axis, second means pivotally connecting said control valve to another point on said lever spaced from the steering axis and said second means, a steering wheel, means operatively connecting said steering wheel to said slave cylinder so that movement of the steering wheel causes the piston member to actuate said control valve through said lever whereby pressurized fluid is directed to said hydraulic cylinder.

3. A hydraulic steering system for an articulated vehicle having first and second frame sections pivotally interconnected about a vertical steering axis, at least one double-acting hydraulic cylinder connected between said frame sections for effecting relative movement thereof about said steering axis, a source of pressurized fluid, a control valve mounted on one of said frame sections for supplying pressurized fluid from said source to the opposite ends of said hydraulic cylinder, an actuator mounted on the other of said frame sections, a lever supported on said vehicle for pivotal movement about said steering axis, first means pivotally connecting said actuator to said lever, second means pivotally connecting said control valve to said lever, a steering wheel, means operatively connecting said steering wheel to said actuator so that movement of the steering wheel causes the actuator to move said control valve through said lever whereby pressurized fluid is directed to said hydraulic cylinder until said one of said frame sections moves relative to said other frame section a distance sufficient to cause the control valve to automatically assume the hold position again.

4. A hydraulic steering system for an articulated vehicle having first and second frame sections pivotally interconnected about a vertical steering axis, at least one double-acting hydraulic cylinder connected between said frame sections for effecting relative movement thereof about said steering axis, a source of pressurized fluid, a control valve mounted on one of said frame sections adjacent said pivot axis for supplying pressurized fluid from said source to said hydraulic cylinder, an actuator mounted on the other of said frame sections adjacent said pivot axis, a lever supported on said vehicle for pivotal movement about said steering axis, first means pivotally connecting said actuator to a point on said lever spaced from the steering axis, second means pivotally connecting said control valve to another point on said lever spaced from the steering axis and said second means, a steering wheel mounted on the same frame section as the actuator, means operatively connecting said steering wheel to said actuator so that movement of the steering wheel causes the actuator to move said control valve through said lever whereby pressurized fluid is directed to said hydraulic cylinder until said one of said frame sections moves relative to said other frame section a distance sufficient to cause the control valve to automatically assume the hold position again.

5. A hydraulic steering system for an articulated vehicle having first and second frame sections pivotally interconnected about a vertical steering axis, at least one double-acting hydraulic cylinder connected between said frame sections for effecting relative movement thereof about said steering axis, a source of pressurized fluid, a control valve mounted on one of said frame sections adjacent said pivot axis for supplying pressurized fluid from said source to said hydraulic cylinder, said control valve supported on the associated frame sections for movement relative thereto and having a first operating position, a second operating position and a hold position, a slave cylinder mounted on the other of said frame sections adjacent said pivot axis, a lever supported on said vehicle for pivotal movement about said steering axis, first means pivotally connecting said slave cylinder to a point on said lever spaced from the steering axis, second means pivotally connecting said control valve to another point on said lever spaced from the steering axis and said second means, a steering wheel, means operatively connecting said steering wheel to said slave cylinder so that movement of the steering wheel causes the slave cylinder to move said control valve through said lever from a hold position to one of said operating positions whereby pressurized fluid is directed to said hydraulic cylinder until said one of said frame sections moves relative to said other frame section a distance sufficient to cause the control valve to automatically assume the hold position again.

6. In an articulated vehicle having first and second frame sections pivotally interconnected for relative steering movement about a vertical axis, at least one double-acting hydraulic cylinder connected between said frame sections for effecting said relative movement, a control valve for activating said cylinder, said control valve comprising a housing secured to one of said frame sections and having a spool valve movable relative thereto for directing pressurized fluid to said cylinder, said spool valve having a first operating position, a second operating position, and a hold position, a lever mounted on said vehicle for pivotal movement about said steering axis, a fluid-operated actuator mounted on the other of said frame sections and having a piston member, means pivotally connecting said spool valve and said piston member to said lever so that a predetermined movement of said piston member results in movement of said spool valve relative to said housing from a hold position to one of said operating positions whereby said hydraulic cylinder is energized to move said one of said frame sections and said housing relative to the other frame section a distance sufficient to cause the spool valve to automatically assume the hold position, a steering wheel supported on said other of said frame sections, and means operatively connected to said steering wheel for energizing said actuator in response to movement of the steering wheel.

7. In an articulated vehicle having first and second frame sections pivotally interconnected for relative steering movement about a vertical axis, at least one double-acting hydraulic cylinder connected between said frame sections for effecting said relative movement, a control valve for activating said hydraulic cylinder, said control valve comprising a housing secured to one of said frame sections and having a spool valve movable relative thereto for directing pressurized fluid to said hydraulic cylinder, said spool valve having a first operating position, a second operating position, and a hold position, a lever mounted on said vehicle for pivotal movement about said steering axis, an actuator mounted on the other of said frame sections, means pivotally connecting said spool valve and said actuator to said lever so that a predetermined movement of said actuator results in movement of said spool valve relative to said housing from a hold position to one of said operating positions whereby said hydraulic cylinder is energized to move said one of said frame sections and said housing relative to the other frame section a distance sufficient to cause the spool valve to automatically assume the hold position, a steering wheel, and means operatively connecting said steering wheel with said actuator for energizing the latter in response to movement of the steering wheel.

8. In an articulated vehicle having first and second frame sections pivotally interconnected for relative steering movement about a vertical axis, at least one double-acting hydraulic cylinder connected between said frame sections for effecting said relative movement, a source of pressurized fluid connected to said cylinder, a control valve interposed between said source and said cylinder, said control valve comprising a housing secured to one of said frame sections and having a spool valve movable relative thereto for directing pressurized fluid to said cylinder, said spool valve having a first operating position, a second operating position, and a hold position, a lever mounted on said vehicle for pivotal movement about said steering axis, an actuator mounted on the other of said frame sections, means pivotally connecting said spool valve and said actuator to said lever so that a predetermined movement of said actuator results in movement of said spool valve relative to said housing from a hold position to one of said operating positions whereby said hydraulic cylinder is energized to move said one of said frame sections and said housing relative to the other frame section a distance sufficient to cause the spool valve to automatically assume the hold position, a steering wheel, and means operatively connecting said steering wheel with said actuator for energizing the latter in response to movement of the steering wheel.

9. In an articulated vehicle having first and second frame sections pivotally interconnected for relative steering movement about a vertical axis, at least one double-acting hydraulic cylinder connected between said frame sections for effecting said relative movement, a control valve for activating said hydraulic cylinder, said control valve comprising a housing secured to one of said frame sections and having a spool valve movable relative thereto for directing pressurized fluid to said hydraulic cylinder, said spool valve having a first operating position, a second operating position, and a hold position, a lever mounted on said vehicle for pivotal movement about said steering axis, a slave cylinder mounted on the other of said frame sections and having a relatively movable piston member, means pivotally connecting said spool valve and said piston member to said lever so that a predetermined movement of said piston member results in movement of said spool valve relative to said housing from a hold position to one of said operating positions whereby said hydraulic cylinder is energized to move said one of said frame sections and said housing relative to the other frame section a distance sufficient to cause the spool valve to automatically assume the hold position, a steering wheel, a hydraulic motor operated by said steering wheel, and means operatively connecting said hydraulic motor with said slave cylinder for energizing the latter in response to movement of the steering wheel.

References Cited by the Examiner

UNITED STATES PATENTS

| 2,896,734 | 7/1959 | Toth | 180—79.2 |
| 3,151,694 | 10/1964 | Rogers | 180—79.2 |
| 3,159,230 | 12/1964 | Gordon | 180—79.2 |

BENJAMIN HERSH, *Primary Examiner.*

J. H. BRANNEN, *Assistant Examiner.*